United States Patent [19]

Dewey et al.

[11] Patent Number: 5,301,324
[45] Date of Patent: Apr. 5, 1994

[54] METHOD AND APPARATUS FOR DYNAMIC WORK REASSIGNMENT AMONG ASYMMETRIC, COUPLED PROCESSORS

[75] Inventors: Pamela H. Dewey; William J. Glynn, both of Poughkeepsie; Roger E. Hough, Highland; Manohar R. Rao, Poughkeepsie, all of N.Y.

[73] Assignee: International Business Machines Corp., Armonk, N.Y.

[21] Appl. No.: 978,601

[22] Filed: Nov. 19, 1992

[51] Int. Cl.5 .................. G06F 15/16; G06F 9/30
[52] U.S. Cl. .................. 395/650; 364/DIG. 1; 364/230.3; 364/281.3; 364/281.8; 364/264.6
[58] Field of Search .................. 395/650, 325, 375

[56] References Cited

U.S. PATENT DOCUMENTS

| | | | |
|---|---|---|---|
| 4,073,005 | 2/1978 | Parkin | 364/DIG. 1 |
| 4,394,727 | 7/1983 | Hoffman et al. | 364/DIG. 1 |
| 4,459,664 | 7/1984 | Pottier et al. | 364/DIG. 1 |
| 4,638,427 | 1/1987 | Martin | 364/DIG. 1 |
| 4,943,912 | 7/1990 | Aoyama et al. | 364/DIG. 1 |
| 5,031,089 | 7/1991 | Liu et al. | 364/DIG. 1 |

Primary Examiner—Eddie P. Chan
Attorney, Agent, or Firm—William B. Porter

[57] ABSTRACT

A tightly-coupled processor complex comprises two or more processors, the complex being asymmetric in that a feature available on one processor is not available on at least one other processor. A work selection mechanism selects one of a set of one or more ready work units, each capable of execution on one or more of the asymmetric processors. A processor set identification function identifies an "indirect idle" set of processors which can participate as hosts in work reassignment to make use of a previously idle processor, and identifies an "indirect bump" set of processors which can participate as hosts in work reassignment to displace a lowest priority work unit previously executing - any work reassignment being initiated by an assigner means and comprising an optimized number of work reassignment steps reassigning work among one of the processor sets to accomplish a related assignment goal (making use of a previously idle processor, or displacing a lowest priority work unit).

14 Claims, 8 Drawing Sheets

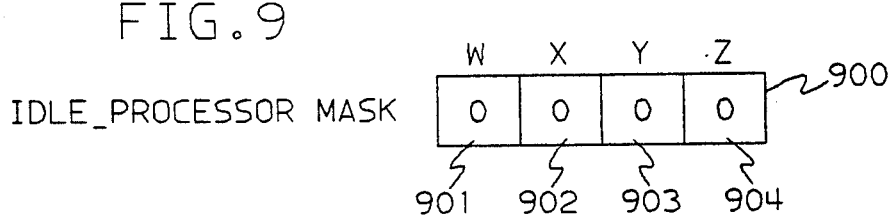
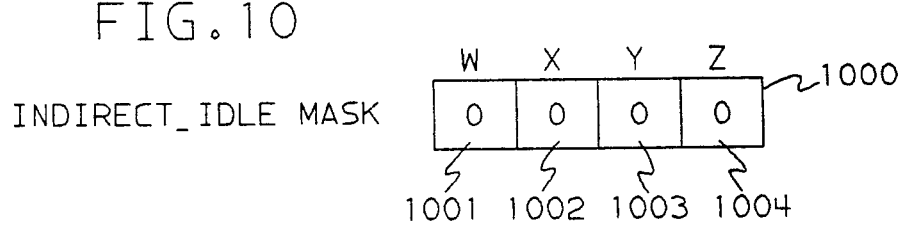
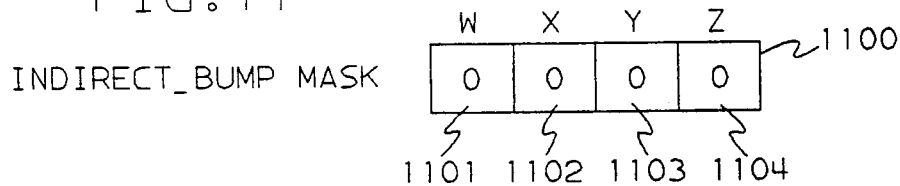
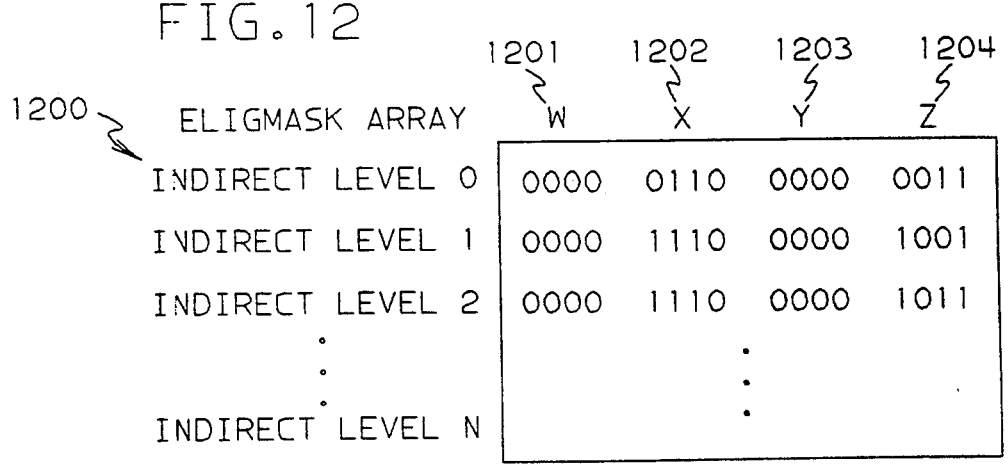

FIG. 13
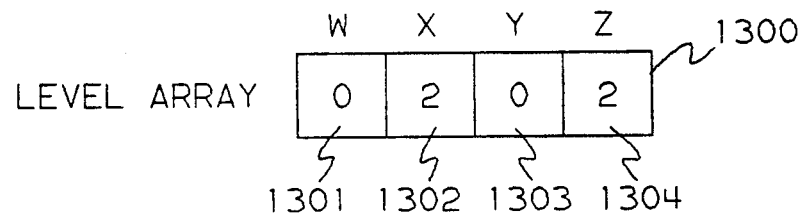
LEVEL ARRAY
FIG. 14
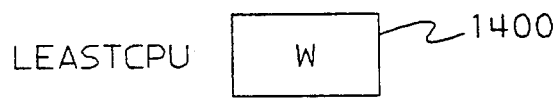
LEASTCPU
FIG. 15
PROCESSOR FEATURE TABLE
| PROCESSOR ID (206) | FEATURE MASK (207) | | | | |
|---|---|---|---|---|---|
| | A | B | C | D | E |
| W | 0 | 0 | 1 | 0 | 1 |
| X | 1 | 0 | 0 | 1 | 0 |
| Y | 0 | 1 | 1 | 1 | 0 |
| Z | 1 | 1 | 0 | 0 | 0 |

METHOD AND APPARATUS FOR DYNAMIC WORK REASSIGNMENT AMONG ASYMMETRIC, COUPLED PROCESSORS

FIELD OF THE INVENTION

This invention relates to the field of multiprocessor computer systems. More particularly, it relates to work unit (task) assignment (dispatching) in a multiprocessor computing system, where the processor features/capabilities are asymmetric (not homogeneous).

BACKGROUND OF THE INVENTION

There exist in the art many schemes for assigning work to a processor of a multiprocessor computer system where the goal is the highest utilization of the processors. In situations where the features of each processor are identical this problem of assigning work is rather straightforward and simple schemes based solely on the importance of the work (priority) perform well. Additionally, in this symmetric multiprocessor environment, schemes of decentralized assignment (where each processor is responsible for assigning its own work) can perform well. But in the case of asymmetric multiprocessors the assignment of work is much more complex. This complexity is caused by the fact that a given processor may be unable to execute a given work unit because of that work unit's need for a feature not present on the given processor. This situation is further exacerbated when the features required by a work unit dynamically change during execution, or if the processors may have their feature availability changed during operation, or even if the configuration of processors changes during operation. There are schemes, in the prior art, which do consider asymmetric multiprocessors when scheduling work units, but they tend to limit their schemes to only direct assignment. That is, when a processor becomes available for work these schemes will only choose ready work which is capable of executing on the available processor. If there is no ready work that can execute on the available processor, the available processor will remain idle, even though there may be some currently executing work which could be moved (redirected) to the available processor to be replaced by a ready piece of work. There are also some examples in the prior art, (for example U.S. Pat. No. 4,394,727 dated Jul. 19, 1983, Multiprocessor Task Dispatching Apparatus, by Roy L. Hoffman et al, assigned to the assignee of the present invention) where work will be moved on occasion, but only if the work replacing it is of a higher priority, thereby still leaving idle processors much of the time. In the prior art problems involving asymmetric assignments were thought to be too complex to solve efficiently or with adequate performance benefit to warrant the overhead of processing the movement of work between processors.

SUMMARY OF THE INVENTION

The invention described here provides a centralized apparatus and method to assign and reassign work units among processors of a multiprocessor computing system having asymmetric features, in order to reasonably optimize use of the processors while running the highest priority tasks, when individual work units may only be able to execute on a subset of the processors. A work selection mechanism selects one of a set of one or more ready work units, each capable of execution on one or more of the asymmetric processors. A processor set identification function identifies an "indirect idle" set of processors which can participate as hosts in work reassignment to make use of a previously idle processor, and identifies an "indirect bump" set of processors which can participate as hosts in work reassignment to displace a lowest priority work unit previously executing—any work reassignment being initiated by an assigner means and comprising an optimized number of work reassignment steps reassigning work among one of the processor sets to accomplish a related assignment goal (making use of a previously idle processor, or displacing a lowest priority work unit).

It is an object of this invention to provide the ability to reassign active work units among processors in order to allow assignment of work units not eligible to an idle processor.

It is further an object of this invention, when reassigning work units is necessary, to determine and perform the minimum number of reassignments.

It is further an object of this invention to be able to displace work units with a higher priority than the work unit to be assigned, knowing the displaced work units will eventually displace a work unit of lower priority than the work unit to be assigned, in order to reasonably utilize the processor resources.

It is further an object of this invention to provide an Assignment means which uses information on processor and work unit status and characteristics to assign work units to eligible processors while incurring the least amount of work unit movement among processors.

It is further an object of this invention to provide a threshold mechanism utilizing the priority difference between the work unit to be assigned and the least urgent (lowest priority) work unit which could be displaced, to avoid excessive reassignment (degradation of overall performance of the computing system) of work units among processors.

It is further an object of this invention to adjust the previously mentioned work unit priority (urgency indication) based upon the amount of processor time consumed and the amount of processor time entitlement, so that contending work units tend to receive a consistent level of processor time.

BRIEF DESCRIPTION OF THE DRAWINGS

FIG. 9 is a diagram of the IDLE_PROCESSOR bit mask containing a bit position for each processor in the system.

FIG. 10 is a diagram of the INDIRECT_IDLE bit mask containing a bit position for each processor in the system.

FIG. 11 is a diagram of the INDIRECT_BUMP bit mask containing a bit position for each processor in the system.

FIG. 12 is a diagram of the ELIGMASK two dimensional array. The dimensions are CPU and INDIRECT-LEVEL.

FIG. 13 is a diagram of the LEVEL array, having one entry per processor (CPU).

FIG. 14 is a diagram of the LEASTCPU data field set to indicate the processor containing the lowest priority work unit to be bumped.

FIG. 15 shows the format and content of the Processor Feature table which describes which features are present on each processor.

DESCRIPTION OF THE PREFERRED EMBODIMENT

The preferred embodiment is depicted in the accompanying figures and the following description.

Following are definitions of terms used within the description of the embodiment.

Assigned—A work unit is assigned when it has been designated by the Assignment means to execute on a given processor.

Unassigned—A work unit is unassigned when it is not in the assigned state. This could be before the work unit has ever been assigned or when a work unit has been removed from a processor.

Selected—A work unit is selected when the processor designated to execute the work unit has initiated (loaded the registers, etc.) the CPU for execution of the work unit. The work unit is said to be "running".

Deselected—A work unit is deselected when the processor that was executing the work has stopped (unloaded the registers, etc.) the CPU from executing this work unit. The work unit is removed from the processor.

Ready—A work unit is ready when there are no events that must complete for the work unit to run. The work unit is capable of executing. Work units that are currently running on a processor are ready. Work units on the Ready queue are ready even though they are not running on a processor.

Suspended—A work unit is suspended when it becomes not ready for execution, such as when it must wait for the occurrence of some event. Suspended work units are not on the Ready queue.

Dispatched—A work unit is dispatch when it is selected and running on a processor.

Runnable—A work unit is runnable when it is capable of executing, i.e. it is ready.

Idle—A processor is idle when it has no work unit assigned. This includes when a work unit has become unassigned, whether or not it has yet become deselected.

Indirect Idle subset—The subset of processors within the candidate work unit's candidate mask which can participate in redirection of work to an idle processor.

Indirect Bump subset—The subset of processors within the candidate work unit's candidate mask which can participate in a redirection of work to bump the lowest priority work unit.

Figure 1:
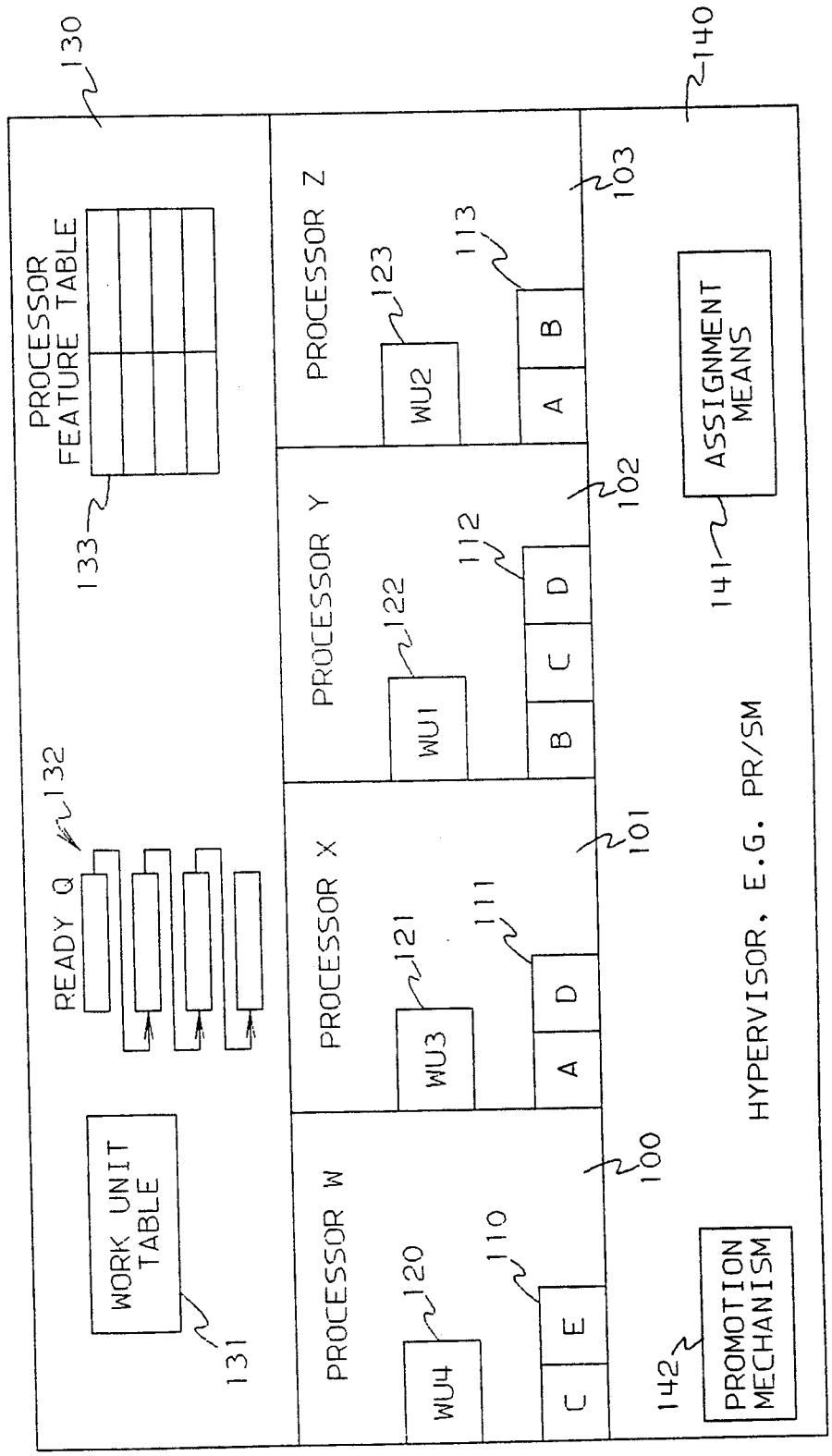
FIG. 1 is a system diagram for the present invention showing a multiprocessor computing system consisting of processors (CPUs) with differing features, having a common memory, containing centralized work unit information, a work unit assignment means and a promotion mechanism.

FIG. 1 shows the system environment within which the present invention operates. FIG. 1 shows a tightly coupled multiprocessor system consisting of four processors (CPUs), processor W, 100, processor X, 101, processor Y, 102, processor Z, 103, sharing a common memory, 130. Each of the processors, 100-103, contain features, 110, 111, 112, 113. Processor W, 100 contains features C and E, 110. Processor X, 101, contains features A and D, 111. Processor Y, 102, contains features B, C, and D, 112. Processor Z, 103, contains features A and B, 113. Each of the processors are currently executing work units. The work units are, WU4, 120, on processor W, 100, WU3, 121 on processor X, 101, WU1, 122, on Processor Y, 102, and WU2, 123, on Processor Z, 103. Shown as residing in the common memory, 130, are key data for assigning work units to processors, 131, 132, and 133. These data are the Work Unit Table, 131, the Ready Queue, 132, and the Processor Feature table, 133. In the preferred embodiment the multiprocessor computing system as shown is executing with a hypervisor, 140, such as IBM's Processor Resource/System Manager, PR/SM, facility in Logical Partitioning, LPAR, mode. The Assignment means, 141, and the Promotion mechanism, 142, are, in the preferred embodiment, a program within the hypervisor. In this example the work units being assigned are actually operating systems which are independent of each other. The invention works equally as well, in an alternative embodiment, in a multiprocessor computing system environment running under control of an operating system, such as IBM's MVS/ESA. In this case the Assignment means and the Promotion mechanism are within the operating system and the work units are tasks, address spaces or jobs. The processors use conventional communication paths for signalling each other.

Figure 2:
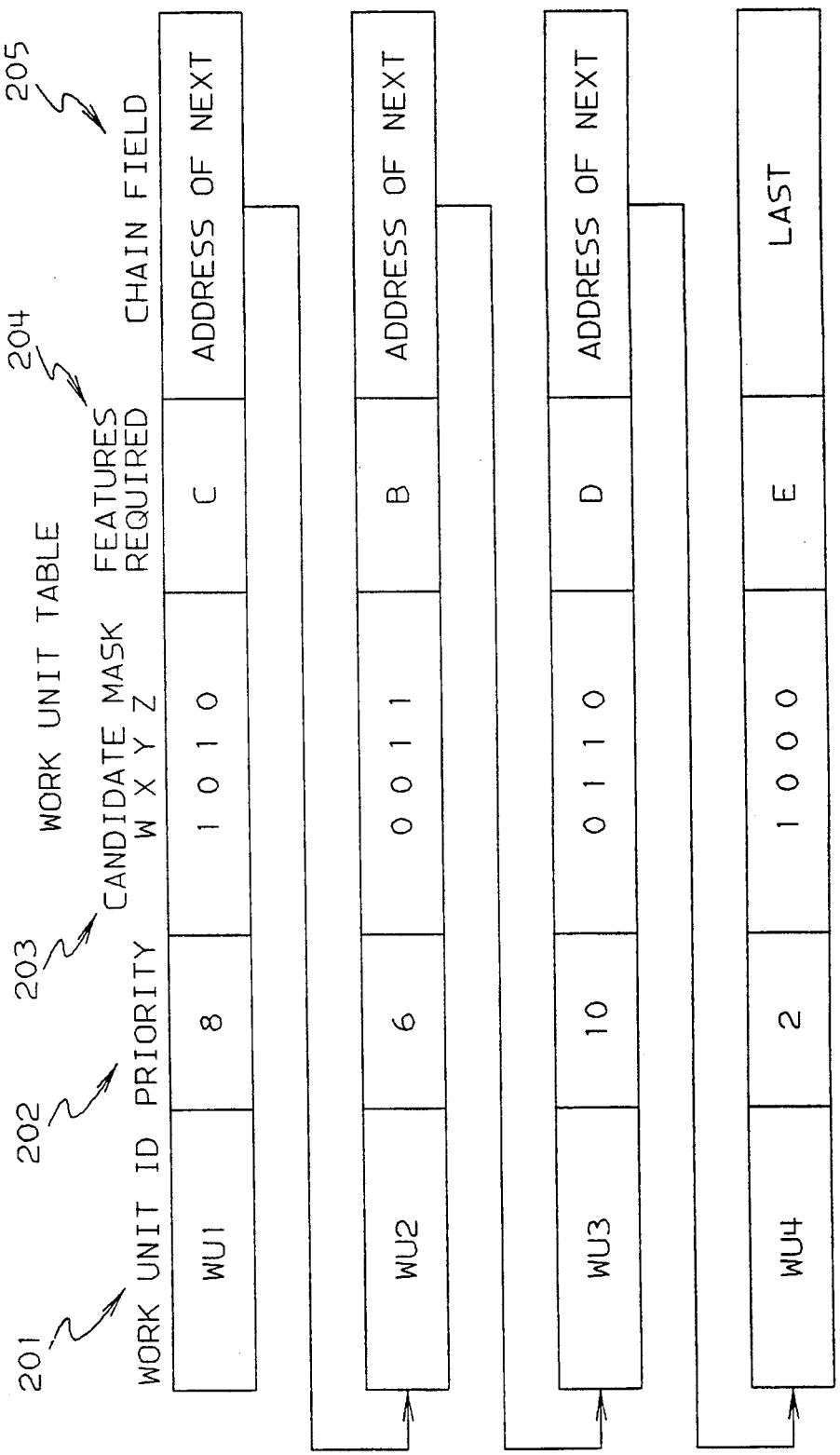
FIG. 2 shows the format and content of the Work Unit table, a linked set of entries describing information about each work unit pertinent to assigning the work unit for execution.

FIG. 2 shows an apparatus called the Work Unit Table which is block 131 of FIG. 1. The Work Unit Table contains entries for every work unit within the computing system, describing the processor features, 204, required, the urgency (priority) of the work unit, and a bit mask of the processors capable of executing the work unit. The fields of the table are as follows:

Work Unit ID, 201—a unique identifier of the work unit.

Priority, 202,—an indication of the urgency (priority) of this work unit.

Candidate mask, 203,—a bit mask indicating which processors have the features needed to run this work unit. A one bit indicates the processor has the necessary features, a zero bit indicates the processor does not have the necessary features.

Features required, 204,—a list of the processor features required to be able to run this work unit.

Chain field, 205,—contains the address of the next Work Unit table entry.

The Work Unit Table, 131, is constructed and maintained by the PR/SM hypervisor, 140.

Figure 3:
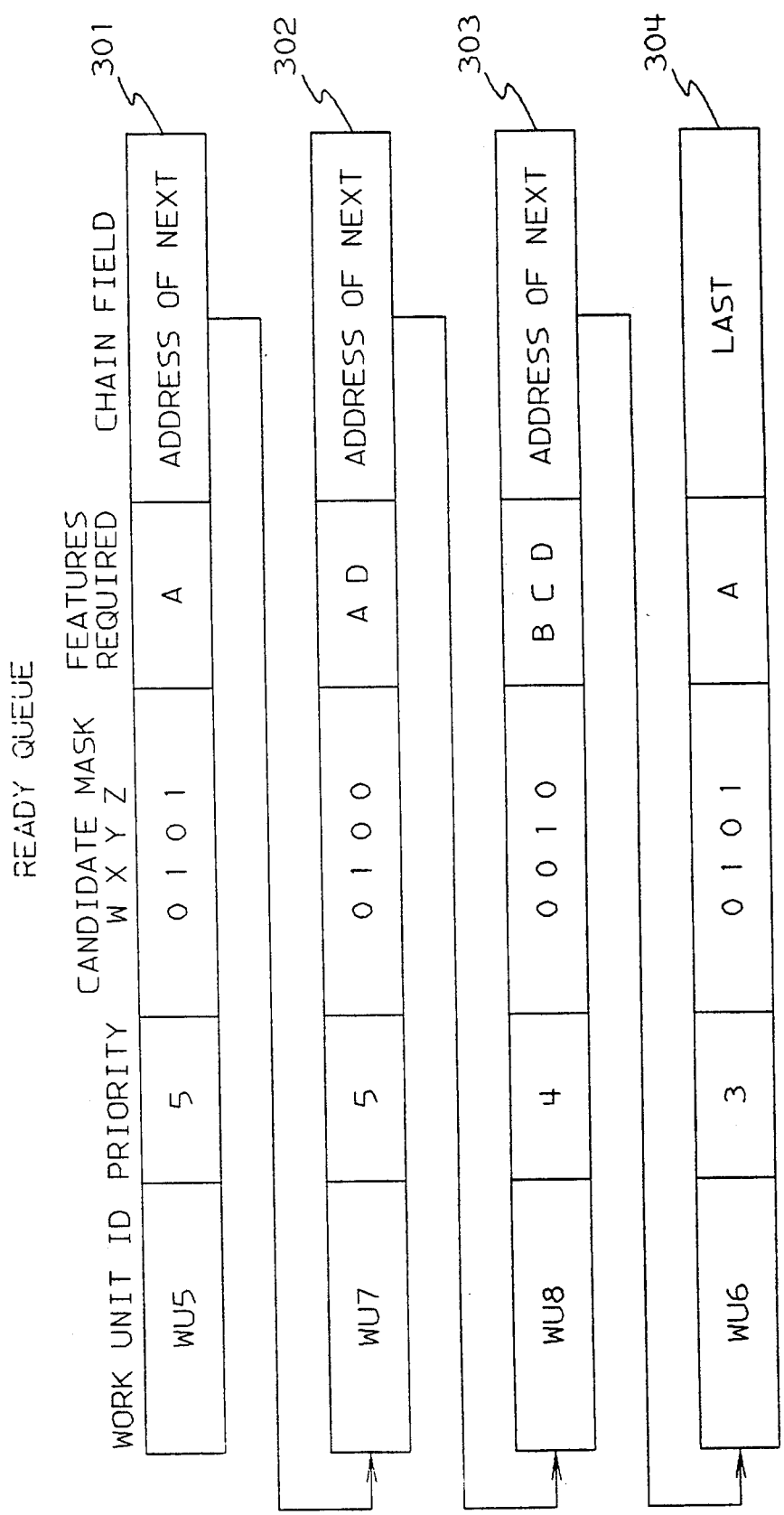
FIG. 3 shows the format of the Ready queue, which comprises Work Unit table entries, in priority order, ready to be assigned to a processor.

FIG. 3 is a diagram of the details of the Ready queue which is block 132 of FIG. 1. The Ready queue, 132, is an ordered list of the Work Unit table entries, FIG. 2, that are in the system, are ready to execute, but are not currently executing on a processor. The entries, 301-304, are in priority order. The Ready queue is constructed and maintained by the PR/SM hypervisor.

Figure 4:
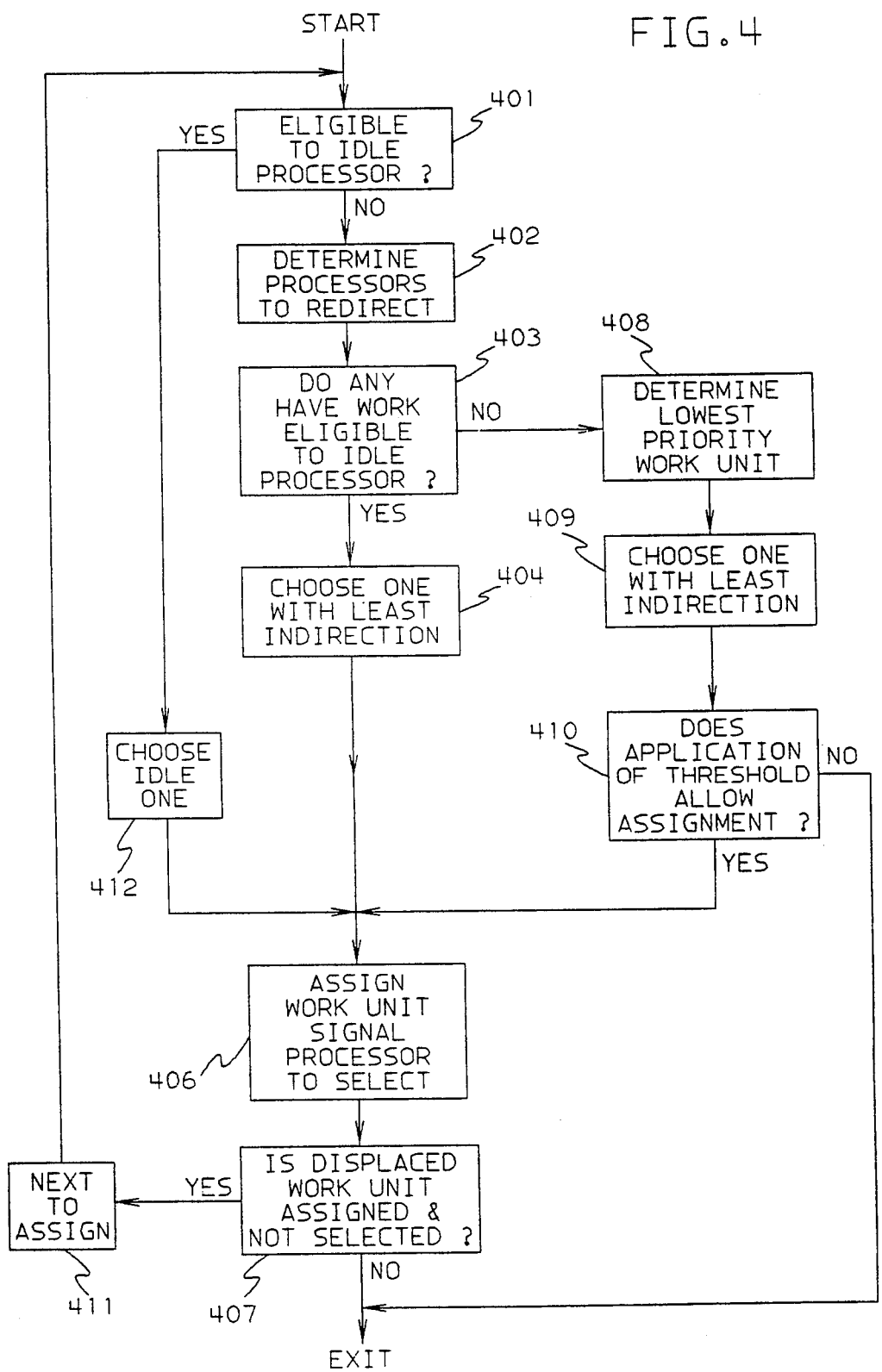
FIG. 4 is a flow diagram for the Assignment means.

FIG. 4 is flow diagram of the Assignment means showing the overall logic used in assigning work among the processors of the multiprocessor system. Work units need to be assigned, or reassigned, to processors when a currently dispatched work unit has been deselected from the processor. A work unit may be deselected due to suspension, time-slice end, a change in feature affinity of the work unit, a change in features available on the physical processor, or mid-dispatch reassignment of another work unit to this physical processor.

All multiprocessor work assignment mechanisms have schemes for determining which work unit to process (assign) next. Most involve some sort of search of a queue of waiting work. The Assignment means of the present invention will work with schemes for choosing work units other than that to be described herein. This preferred embodiment describes the scheme used to drive the Assignment means of this invention. The Assignment means processes one work unit per invocation, called the candidate work unit in this description. The Assignment means is entered in three cases;

1. At the transition of a work unit from suspended (not ready) to ready.
2. As part of "promotion", the choosing of a ready work unit for assignment when a processor becomes idle (time slice end, suspension of the work unit, change in feature affinity of the work unit to eliminate this processor). The promotion scheme used in this invention is described in more detail below.
3. As part of deselection of a work unit if that work unit is still ready but no longer the currently assigned work unit for this processor.

Referring to FIG. 4, the Assignment means determines if the candidate work unit is eligible to an idle processor (FIG. 4 at 401). If it is eligible for an idle processor, the idle processor is chosen for the candidate work unit (FIG. 4 at 412) and processing continues at FIG. 4, 406, to be described subsequently. If the candidate work unit is not eligible for an idle processor then the Assignment means determines which processors can have currently running work redirected (reassigned) in order to assign the candidate work unit (FIG. 4 at 402). This will be described in more detail below (under "Determining processors for redirection"). Next, the Assignment means checks if, within the set of processors that can participate in redirection of work (processing done in FIG. 4 at 402), there is any work unit running on one of that set of processors that is eligible to an idle processor (FIG. 4 at 403). If there is such a work unit running on the set of processors that can participate in a redirection of work, then the Assignment means chooses (FIG. 4 at 404), for assignment of the candidate work unit, the processor that causes the minimum indirection that allows use of the idle processor. This will be described in more detail below (under "Minimum indirection to an idle processor"). Processing then continues at FIG. 4, 406, to be described subsequently. If, from the processing at FIG. 4, 403, there is no currently running work unit, within the set of processors that can participate in a redirection of work, that is eligible to an idle processor, then in order to assign the candidate work unit, some lower priority work unit must be deselected (bumped) from a processor. The Assignment means then determines which is the lowest priority work unit among the processors that can participate in a redirection of work (FIG. 4 at 408). This will be described in more detail below ( under "Determining lowest priority work unit"). That lowest priority work unit is the one to be finally deselected (bumped) in order to assign the candidate work unit. The Assignment means then chooses for assignment, of the candidate work unit, the processor (FIG. 4 at 409) that causes the minimum indirection that allows use of the processor running the previously mentioned lowest priority work. This will be described in more detail below (under "Minimum indirection to displace lowest priority work"). The Assignment means then uses a threshold mechanism to determine if the candidate work unit is high enough in priority to cause redirection of work units, FIG. 4 at 410. The threshold in this embodiment is based on a sampling interval of the time-slice scheduler and is used as a divisor of the difference in priorities between the candidate work unit and the lowest priority work unit to be redirected. Although this threshold mechanism is used in the invention, others may be used without departing from the spirit of the invention. If the application of the threshold, FIG. 4 at 410, does not allow the candidate work unit to be assigned, this assignment pass is complete and the Assignment means exits. Otherwise, processing continues (FIG. 4 at 406) now that a processor has been chosen for the candidate work unit. The candidate work unit is assigned to the processor chosen and the processor chosen is signalled (FIG. 4 at 406) to select this candidate work unit and to deselect any work unit it may be running. If there is a work unit being displaced (redirected by this processing), the Assignment means checks to see if the displaced work unit has been assigned to the deselecting processor but not yet selected for running (FIG. 4 at 407). This could happen in a multiple reassignment scenario where the Assignment means is proceeding at a much quicker pace than the program doing the deselection/selection (for example the Assignment means may have the highest priority in the system). If this is the case (the work unit being displaced is assigned to, but not selected by, the processor it is being displaced from), then this displaced work unit will be the next to be assigned (FIG. 4 at 411) by proceeding to FIG. 4, 401, and assigning this displaced work unit. If this was not the case (the work unit being displaced is assigned to, and selected by, the processor it is being displaced from) FIG. 4 at 407, then processing is complete and the Assignment means exits.

Determining processors for redirection

Figure 5:
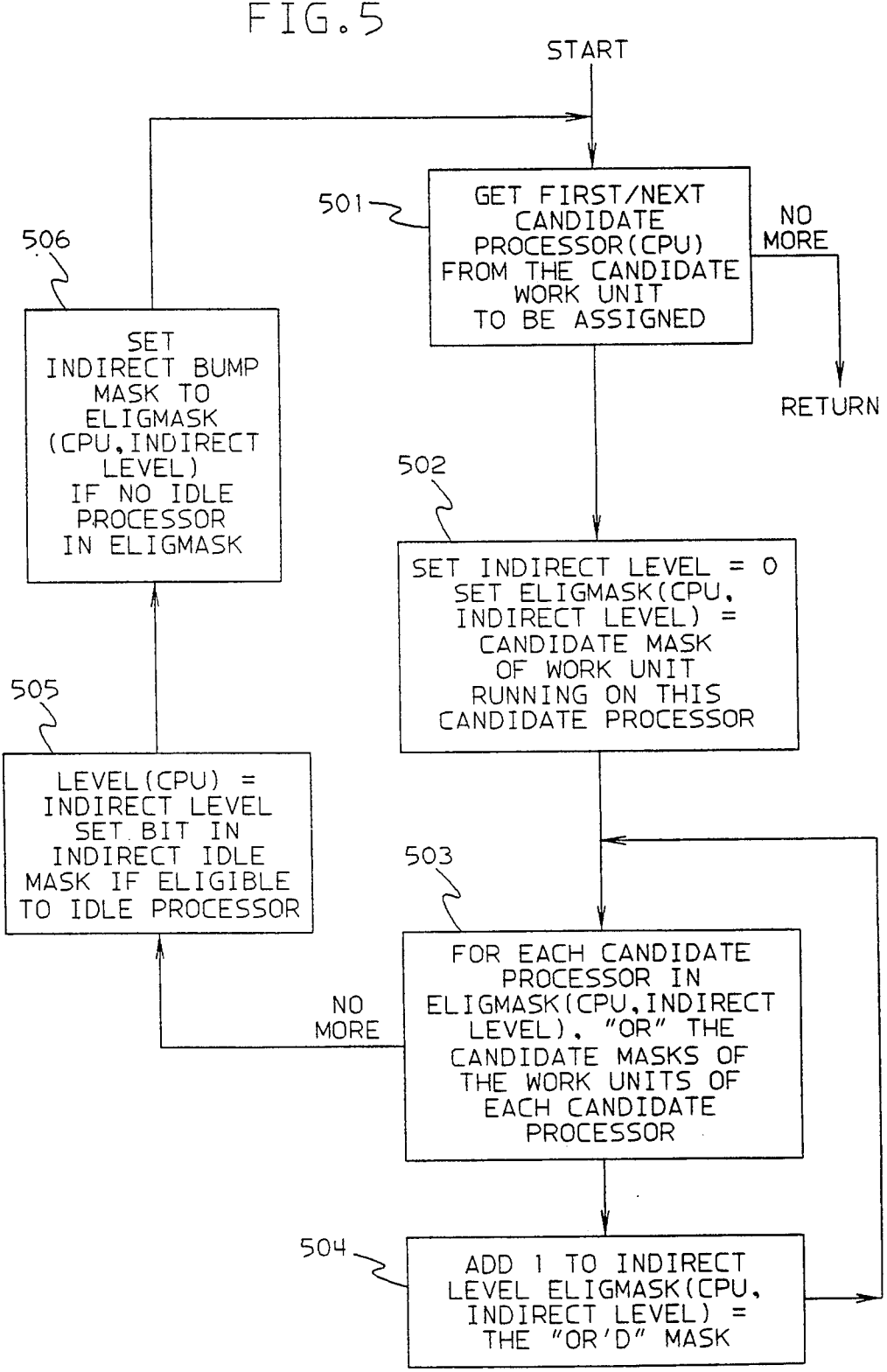
FIG. 5 is a flow diagram for the "determine processor set" logic of the Assignment means.

To determine the processors which can participate in a redirection of work (FIG. 5, which is a further refinement of FIG. 4, 402) the Assignment means looks at each candidate processor in the candidate mask, 204, for the candidate work unit (FIG. 5 at 501). The ELIGMASK array, FIG. 12, is then constructed first by setting the INDIRECTLEVEL index to zero (indicating no level of indirection) and setting the CPU index of this ELIGMASK entry to the first candidate processor. The ELIGMASK (CPU,INDIRECTLEVEL) entry is set equal to the candidate mask, 204, of the work unit running on this candidate processor (FIG. 5 at 502). The Assignment means then completes the ELIG- MASK entries for this candidate processor(CPU) by "OR"ing together the candidate masks of each work unit running on the processors indicated by the previous ELIGMASK entry (FIG. 5 at 503 and 504). When the previous ELIGMASK entry is equal to the latest ELIGMASK entry then all ELIGMASK entries have been built for a candidate processor(CPU). The LEVEL array entry, 1301-1303, for this candidate processor is set to the INDIRECTLEVEL (FIG. 5 at 505), indicating the number of redirections which must be considered if this processor is assigned the candidate work unit. The INDIRECT_IDLE mask and/or INDIRECT_BUMP mask are updated (FIG. 5 at 505 and 506). If the last ELIGMASK entry, 1200, for this candidate processor has a bit on for an idle processor, as indicated by IDLE_PROCESSOR mask (FIG. 9, 901-904), then the bit for this candidate processor is set (FIG. 5 at 505) in INDIRECT_IDLE mask, FIG. 10, 1001-1004. If the last ELIGMASK entry, 1200, for this candidate processor does not have a bit on for an idle processor then the INDIRECT_BUMP mask, FIG. 11, 1101-1104, is set equal to the last ELIGMASK entry, 1200 (FIG. 5 at 506). Processing then continues at FIG. 5, 501 with the next candidate processor until they have all been processed. At the end of this processing the INDIRECT_IDLE mask, FIG. 10, 1000, contains a bit on for each processor in the candidate work unit's candidate mask that can participate in a redirection to an idle processor. The INDIRECT_BUMP mask, FIG. 11, 1100, contains a bit on for each active processor within the candidate work unit's candidate mask which can participate in a redirection to bump work. The ELIGMASK array, FIG. 12, 1200, contains entries for each candidate processor, indicating the level of indirection necessary to use a candidate processor. The LEVEL array entries, 1301-1303, contain the levels of indirection which must be considered for each processor.

Minimum indirection to an idle processor

Figure 6:
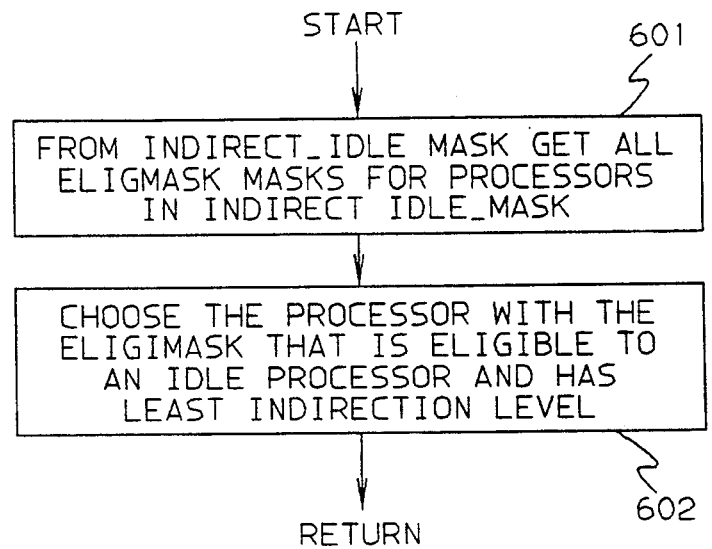
FIG. 6 is a flow diagram for the logic to choose a processor for assignment which causes the least indirection to utilize an idle processor, within the Assignment means.

In choosing the candidate processor for assignment of the candidate work unit, when indirection is necessary, if an idle processor can be used then the candidate work unit must be assigned to the processor which in turn causes the least amount of indirection (movement of work units). The logic for this is shown in FIG. 6 (which is a further refinement of FIG. 4, block 404). Using the INDIRECT_IDLE mask, 1000, created previously, FIG. 5 at 505, for each bit on in the INDIRECT_IDLE mask, 1001-1003, the ELIG_MASK entries, 1200, representing those processors are retrieved, FIG. 6 at 601. Each of these bits in INDIRECT_IDLE mask, 1001-1003, represent a processor to which the candidate work unit can be assigned. The Assignment means then selects the processor that has the least (lowest value) amount of indirection as indicated by LEVEL array and ELIG MASK entries, 1300, FIG. 6 at 602.

Determining lowest priority work unit

Figure 7:
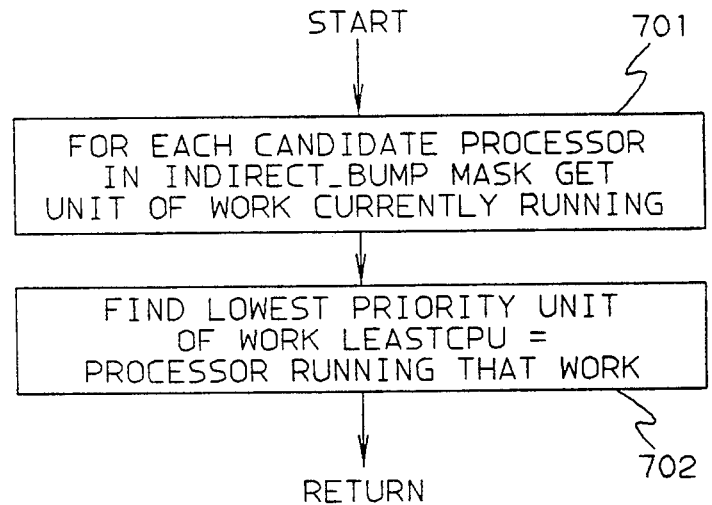
FIG. 7 is a flow diagram for the logic to determine the processor running the lowest priority work unit that can be bumped, within the Assignment means.

In choosing the candidate processor for assignment of the candidate work unit, when indirection is necessary and no idle processor can participate in the redirection, the processor running the lowest priority work unit, which can participate in the redirection must be determined. The logic for this is shown in FIG. 7 (which is a further refinement of FIG. 4, block 408). Using the INDIRECT_BUMP mask, 1100, created previously, FIG. 5 at 506, for each bit on in the INDIRECT_BUMP mask, 1101-1103, the priority is retrieved, 202, of the work unit running on the processor represented by that bit in INDIRECT_BUMP mask, 1101-1103, FIG. 7 at 701. The identity is saved of the processor, 100-103, which has the work unit with the lowest priority, 202, in the LEASTCPU data field, 1400, FIG. 7 at 702.

Minimum indirection to displace lowest priority work

Figure 8:
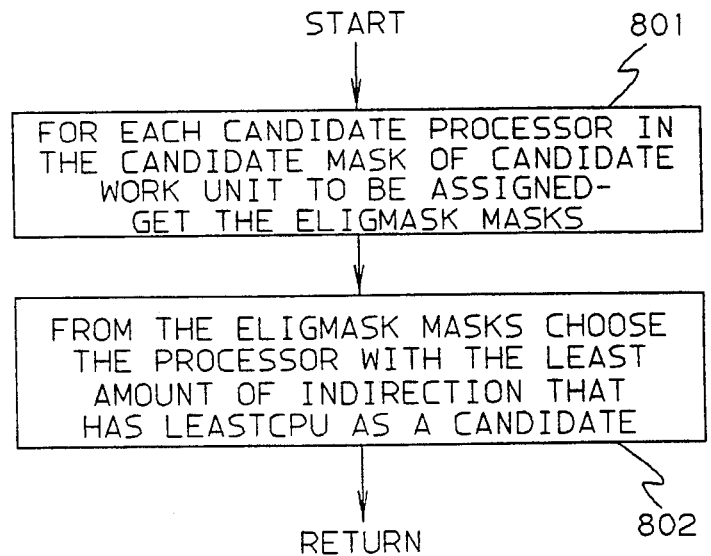
FIG. 8 is a flow diagram for the logic to choose a processor for assignment which causes the least indirection to bump the lowest priority work, within the Assignment means.

In choosing the candidate processor for assignment of the candidate work unit, when indirection is necessary and no idle processor can participate in the redirection, after determining the processor with the lowest priority work unit, FIG. 7, the candidate processor is chosen, which causes the least indirection (movement of work units) to bump the lowest priority work unit. This logic is shown in FIG. 8, (which is a further refinement of FIG. 4, block 409). Using the ELIGMASK array, 1200, created previously, FIG. 5 at 503 and 504, for the candidate work unit, the ELIGMASK entries, 1200, are retrieved, FIG. 8 at 801. From the ELIGMASK entries, 1200, the candidate processor is chosen, which has LEASTCPU, 1400, (created previously in FIG. 7, block 702) as a candidate and with the least amount of indirection, from the LEVEL array, 1301-1304, FIG. 8 at 802.

Example of indirection

The following example shows how the invention operates Using the environment as shown in FIGS. 1, 2 and 3, and the logic in FIGS. 4-8 the invention is shown in operation. Assume that work unit WU4, 120, running on processor W, 100, becomes suspended. This will cause processor W to deselect work unit WU4, 120. The IDLE_PROCESSOR mask, FIG. 9, will have the bit for processor W set to one, processor W will no longer have a currently executing work unit. The promotion logic, (to be described in more detail below under "Promotion") will be executed and will choose, from the Ready queue, FIG. 3, the entry for work unit WU5, 301, since no work unit on the Ready queue, FIG. 3, is eligible to the vacated processor W, 100, and work unit WU5 is the highest priority work unit on the Ready queue, FIG. 3. Work unit WU5 is now the candidate work unit. Using the logic in FIG. 4, it is determined that redirection is required to assign the candidate work unit. Using the logic of FIG. 5 we can see how the invention determines which processors, 100-103, can participate in the redirection. The ELIGMASK array, FIG. 12 is created by this logic. The candidate work unit is eligible to processors X, 101, and Z, 103. First the ELIGMASK, 1200, entries for ELIGMASK(X, INDIRECTLEVEL), FIG. 12, are constructed. Starting from the candidate mask of the work unit, WU3, 121, running on processor X, 101, the ELIGMASK(X,0) is created as seen in FIG. 12. Then by "OR"ing together the candidate masks of the work units running on the processors indicated in ELIGMASK(X,0), FIG. 12, the ELIGMASK(X,1) is constructed, as seen in FIG. 12. This logic is continued with ELIGMASK(X,1) to construct ELIGMASK(X,2) Since ELIGMASK(X,1) and ELIGMASK(X,2) are identical the processing for candidate processor X, 101, is complete. Since ELIGMASK(X,2) has a bit on for processor W, 100, which is the idle processor, then the bit in the INDIRECT_IDLE mask, 1002, for processor X is turned on. Processing then continues for the next candidate processor of the candidate work unit, processor Z,103. The operation is identical and results in ELIGMASK(Z,0), ELIGMASK(Z,1), and ELIGMASK(Z,2), FIG. 12, being constructed. Since ELIGMASK(Z,2) has a bit on for processor W, 100, which is the idle processor, then the bit in the INDIRECT_IDLE mask, 1002, for processor Z, 1002, is turned on. The LEVEL array, FIG. 13, is also set as shown. Next, using the data created previously, the logic shown in FIG. 6 will choose processor X, 101, for assignment of the candidate work unit. This causes work unit WU3, 121, to be deselected from processor X, 101. An assignment attempt is now made for work unit WU3. This candidate work unit is eligible for processors X, 101, and Y, 102. So the ELIGMASK entries for those processors will be built as described before. Using the same logic as previously, this candidate work unit will be assigned to processor Y, 102, because using processor Y, 102, requires only one level of indirection, while using processor X, 101, would require more levels of indirection. The work unit WU1, 122, on processor Y, 102, will be deselected. An assignment attempt for work unit WU1, 122, is now made. Since work unit WU1, 122, is eligible to processor W, 100, the idle processor, it is immediately assigned there. The assignment is now complete. This example illustrates the redirection of work units, the preference for an idle processor, and the movement of work higher in priority than the candidate work unit when necessary.

Promotion

As stated previously, all assignment schemes have some mechanism of choosing work units for assignment when a processor becomes idle (e.g., time slice end, suspension of the work unit, change in feature affinity of the work unit to eliminate this processor). This is herein referred to by the term "Promotion" of work. The promotion logic of this invention has as its input the Ready queue, FIG. 3. Key objectives of the promotion mechanism are to search as little of the Ready queue, FIG. 3, as possible, and to make as few Assignment attempts as possible. Described now is the promotion scheme of the preferred embodiment, but others may be used without departing from the spirit of the claimed invention.

Promotion to fill the vacancy left when a work unit is deselected is accomplished by a series of assignment attempts. Because there is no bound placed on indirection to idle processors, the idle appearance of a processor after a work unit is deselected would cause unjustified indirection if the first assignment attempt following deselection were for a work unit with candidates which did not include the vacated processor, when ready and unassigned work exists for which the vacated processor is a candidate. A first pass of the Ready queue, FIG. 3, is thus required to perform an assignment attempt for the most urgent ready and not assigned work unit for which the vacated processor is a candidate. The ready and unassigned work units for which indirection must then be considered consist of those work units with greater urgency than the most urgent work unit for which the vacated processor is a candidate. If no ready and unassigned work unit is found for which the vacated processor is a candidate, then the entire Ready queue, FIG. 3, must be considered for indirection. Such indirection can only occur, however, if work units assigned to other processors include the vacated processor as a candidate. If work units assigned to other processors do not include the vacated processor as a candidate, there is no need for a second pass to consider additional assignment attempts to deal with potential indirection.

When the work unit being deselected continues to be runnable and the candidate mask has been changed to include candidates which were not previously present, this creates a potential to utilize or improve the utilization of an additional processor. If the work unit for which an assignment attempt is issued by the first pass is the work unit being unassigned under these circumstances, the work units for which indirection must be considered are those up to and including the first ready and unassigned work unit for which the vacated processor is a candidate, rather than those which precede the work unit for which an assignment attempt is issued in the first pass. If the work unit for which an assignment attempt is issued by the first pass is not the work unit being deselected under these circumstances, then a separate assignment attempt must be issued for the work unit being deselected either during or after the second pass, if any. If making a second pass to deal with indirection, the assignment attempt for the work unit being deselected should be made in sequence, while running the queue from most to least urgent, but the candidate processors for the work unit being deselected cannot be included in any mask of processors covered for the sake of indirection in a second pass. When the work unit being deselected continues to be runnable and the candidate mask has been changed to include candidates which were not previously present and no assignment attempt has been issued for this work unit in either a first or second pass through the Ready queue, FIG. 3, then a separate assignment attempt must be issued for the work unit being deselected before the promotion process may be considered complete.

When the work unit being deselected continues to be runnable and the candidate mask has been changed to exclude the processor being vacated, a potential to omit a necessary assignment attempt for the work unit being deselected could exist without an extra assignment attempt for the work unit. The work unit for which an assignment attempt is issued by the first pass is not the work unit being deselected under these circumstances. A separate assignment attempt must be made for the work unit being deselected either during, or after, the second pass, if any. If making a second pass to deal with indirection, the assignment attempt for the work unit being deselected should be made in sequence, while running the queue from most to least urgent, but the candidate processors for the work unit being deselected cannot be included in any mask of processors covered for the sake of indirection in a second pass. When the work unit being deselected continues to be runnable and the candidate mask has been changed to include candidates which were not previously present or to exclude the vacated processor and no assignment attempt has been issued for this work unit in either a first or second pass through the Ready queue, FIG. 3, then a separate assignment attempt must be issued for the work unit being deselected before the promotion process may be considered complete.

During the second pass to deal with indirection, if an assignment attempt has been made for a work unit with a certain priority, an assignment attempt for other work units of less urgent priority need only be considered when those work units are eligible for execution on processors other than those for which an assignment attempt has already been made. In running the Ready queue, FIG. 3, from greater to lesser urgency, one can thus maintain a mask which is the Inclusive-OR of the candidate mask for every work unit for which an assignment attempt has been made and skip the assignment attempt for any work unit for which all candidates are included within this mask. An exception to this is when the candidate mask for the work unit being deselected continues to be runnable and has been changed to include candidates which were not present when the work unit was selected, which creates the potential to utilize or improve the utilization of an additional processor. In this case, a separate assignment attempt must be made for the work unit being deselected, for which the candidates must not be included in the Inclusive-OR mask of processor candidates for every unit of work for which an assignment attempt has been made.

Summary of promotion

1. A first pass through the Ready queue, FIG. 3, issues an assignment attempt for the highest priority, ready and not assigned work unit for which the vacated processor is one of the candidates.
2. Unless an extra assignment attempt was made necessary by the addition of candidates to a work unit and was dealt with in the first pass, a second pass is needed only if a currently assigned work unit exists on some other processor for which the vacated processor is a candidate.
3. A second pass through the Ready queue, FIG. 3, deals with indirection. Assignment attempts are issued for each ready and not assigned work unit with candidates for which no assignment attempt has yet been issued in this pass.
   a. If an extra assignment attempt was made necessary by the addition of candidates to a work unit and was dealt with in the first pass, the second pass stops after the first work unit for which the vacated processor is a candidate.
   b. Otherwise, if the first pass issued an assignment attempt, the second pass stops at the work unit for which an assignment attempt was issued in the first pass.
   c. Otherwise, the second pass stops at the end of the ready queue, FIG. 3.
4. At the completion of these passes, if an extra assignment attempt made necessary by the addition of new candidates to a work unit has not yet been issued, it must be issued.

The use of a threshold

As noted previously, the Assignment means uses a threshold mechanism to avoid excessive redirection of work units. The threshold mechanism used in this invention will be explained, but other thresholds (or no threshold) can also be used with the Assignment means. The threshold used in this invention has two forms.
1. When no indirection is required to bump the lowest priority work unit.
   a. When the lowest priority work unit is assigned but not selected, a zero threshold is used, meaning no threshold is employed.
   b. Where the lowest priority work unit is assigned and selected, the threshold is a fraction of the time-slice scheduler sample interval (50 milliseconds is the sample interval in the preferred embodiment).
2. Where indirection is required to bump the lowest priority work unit, the difference in priority between the lowest priority work unit and the candidate work unit is divided by the threshold to determine a maximum number of levels of indirection which the difference in priority will support. A threshold of one quarter sample interval (12.5 milliseconds in the preferred embodiment) is used.

Priority and Relative Share of the Processor

As stated previously, the priority of work units is used in assignment decisions. The manner of setting this priority, though not part of the Assignment means, is related to overall system performance. Accordingly, one technique for dynamically adjusting priority is described below. This technique strives to provide a consistent, entitled share of the CPU resource among the work units by adjusting priority based on entitled relative share and actual consumption. Relative processing weight, or relative share, is enforced through the use of negative feedback. The CPU time consumed by each work unit is converted to the elapsed time in which this amount of CPU time should be provided, referred to as effective time. For a work unit entitled to one half of a CPU, the effective time will be twice the CPU time consumed. For a work unit entitled to one third of a CPU, the effective time will be three times the CPU time consumed, etc. The amount of CPU time consumed during the scheduling period determines priorities for dispatching. Those furthest behind in achieving their intended allocation of CPU resources have the most urgent priority.

A limit must be placed on the amount of processing time to which a work unit may be entitled in response to long periods of idleness. Otherwise, a work unit could remain idle one day and be the most urgent in priority throughout the next day. This limit is implemented by using a history table for each work unit. Each history table consists of entries of cumulative totals of effective time for each of the most recent X sampling periods. At the end of each sampling period, the oldest sample is discarded, becoming an origin value, and a new sample is begun. In this embodiment, a total of thirty-one 50 millisecond sample period values are retained in the history table. The history is aged at the end of each sampling period.

Capping is implemented by suspending work units which have reached an amount of effective time equal to the difference in time between the start and the end of the history table. To allow each capped work unit to receive some processing within each sample period, its time-slice is limited to the processing time for which the effective time is equal to the duration of a sample period.

Particularly with capping, history would tend to repeat itself if no further measures were taken. As each sample interval ended, a work unit suspended for capping would become entitled to exactly the same amount of processing time consumed in the period just discarded from the history table. In an extreme example, a previously idle work unit entitled to one third of a CPU would run continuously for one third of the history period, about half a second. It would remain suspended for about one second, until the first sample in which it ran became discarded. It would then run continuously for another half second and be suspended for a full second thereafter. This would repeat indefinitely, as long as the work unit remained runnable.

To prevent such continuous oscillation, weighted averaging is applied to the samples within the history table, such that the oldest eight samples have one half the weight of all other samples. In the example of a previously idle work unit entitled to one third of a CPU, it runs continuously for one third of the history period, about one half second. It remains suspended for about 1.2 seconds, until the first sample in which it was active reaches one of the half-weight positions within the history table. For the next period, it is entitled to only half of the processing time consumed in the sample for which the weight has been reduced. In a like manner, as each of the samples in which the work unit had consumed an entire CPU enters the weighted area, the work unit becomes entitled to half of the processing time consumed in that period. The amount of the processing time discarded and the amount of the processing time for which the weight has been reduced may be equal for some time, during which there is no further reduction in the amount of time to which the work unit is entitled, but the fraction of the history table for which this is allowed will be reduced from one cycle to the next. This provides a dampening of the oscillation.

Capping

A capped work unit which has exceeded the amount of processing time to which it is entitled for the current scheduler time interval is perceived as suspended with respect to assignment. A work unit is placed into capping suspension when it is deselected if its processing time exceeds the amount to which it is entitled within the current scheduler time interval. At the end of each scheduler time interval, an assignment attempt is performed for each work unit for which capping suspension has been removed.

What is claimed is:

1. An apparatus for dynamic work reassignment comprising:
   a. a tightly coupled processor complex comprising two or more processors, at least one of said two or more processors having a feature usable by any work unit executing on said at least one processor;
   b. one or more ready work units, each of said ready work units capable of execution on one or more of said two or more processors;
   c. a control function means for allocating resources among work units, said control function means comprising assignment means for assigning a chosen one of said one or more ready work units to a target one of said two or more processors, said assignment means comprising:
      i) processor set identification means for identifying a set of one or more destination processors within said tightly coupled processor complex to which currently running work, displaced directly or indirectly because of said assigning, can be redirected to other one of said two or more processors by one or more work redirection actions;
      ii) analysis means for analyzing the work redirection actions that result from different choices of said target from among said two or more processors, and, based on said analyzing, selecting said target so that said work redirection actions are projected, by said analyzing, to satisfy a specific processor complex goal.

2. The apparatus of claim 1 in which said processor set identification means comprises means for identifying, by an indirect idle mask, a subset of said set of one or more destination processors to accomplish the processor complex goal of redirecting work to a previously idle one of said two or more processors after completion of said one or more work redirection actions.

3. The apparatus of claim 2 further comprising means for ensuring that said one or more work redirection actions comprises a minimum number of said work redirection actions.

4. The apparatus of claim 1 in which said processor set identification means comprises means for identifying, by an indirect bump mask, a subset of said set of one or more destination processors to accomplish the processor complex goal of displacing a lowest priority work unit of a set of active work units executing on said subset of said set of one or more destination processors, after completion of said one or more work redirection actions.

5. The apparatus of claim 3 further comprising means for ensuring that said one or more work redirection actions comprises a minimum number of said work redirection actions.

6. The apparatus of claim 4 in which said assigner means further comprises means for ensuring that said assigning is not performed unless a specific criterion is satisfied.

7. The apparatus of claim 6 in which said specific criterion comprises a value, derived using a threshold, representing a maximum acceptable number of said work redirection actions 8. An apparatus for dynamic work reassignment comprising:
   a. a tightly coupled processor complex comprising two or more processors, at least one of said two or more processors having a feature usable by any work unit executing on said at least one processor;
   b. one or more ready work units, each of said ready work units capable of execution on one or more of said two or more processors;
   c. a control function means for allocating resources among work units, said control function means comprising assignment means for assigning a chosen one of said one or more ready work units to a target one of said two or more processors, said assignment means comprising:
      i) processor set identification means for identifying a set of one or more destination processors within said tightly coupled processor complex to which currently running work, displaced directly or indirectly because of said assigning, can be redirected to other one of said two or more processors by one or more work redirection actions, said processor set identification means comprising means for identifying, by an indirect idle mask, a first subset of said set of one or more destination processors to accomplish a processor complex goal of redirecting work to a previously idle one of said two or more processors after completion of said one or more work redirection actions, said processor set identification means further comprising means for identifying, by an indirect bump mask, a second subset of said set of one or more destination processors to accomplish the processor complex goal of displacing a lowest priority work unit of a set of active work units executing on said second subset of said set of processors, after completion of said one or more work redirection actions;

ii) analysis means for analyzing the work redirection actions that result from different choices of said target from among said two or more processors, and, based on said analyzing, selecting said target so that said work redirection actions are projected by said analyzing, to satisfy a specific processor complex goal said first subset of processors being used by said analysis means if said first subset is not empty, said second subset being used by said analysis means if said first subset is empty, said analysis means further comprising means for ensuring that, when said first subset is empty, said assigning is not performed unless a total number of said work redirection actions is less than a threshold derived value, said threshold derived value indicating a maximum acceptable number of said work redirection actions;

d. minimization means for ensuring that said one or more work redirection actions comprises a minimum number of said work redirection actions.

9. A method for dynamic reassignment of work units in a tightly coupled data processing complex comprising two or more processors, at least one of the two or more processors having a feature usable by any work unit executing on said at least one processor, said method comprising the steps of:

a. choosing one of a set of one or more ready work units for assignment consideration, each of said one or more ready work units capable of execution on one or more of said two or more processors;

b. assigning a chosen one of said one or more ready work units to a target one of said two or more processors by:

i) identifying a set of one or more destination processors within said tightly coupled processor complex to which currently running work, displaced directly or indirectly because of said assigning, can be redirected to other one of said two or more processors by one or more work redirection actions;

ii) analyzing the work redirection actions that result from different choices of said target from among said two or more processors, and, based on said analyzing, selecting said target so that said work redirection actions are projected, by said analyzing, to satisfy a specific processor complex goal.

10. The method of claim 9 further comprising the step of identifying, by means of an indirect idle mask, a subset of said set of one or more destination processors to accomplish the processor complex goal of redirecting work to a previously idle one of said two or more processors after completion of said one or more work redirection actions.

11. The method of claim 10 further comprising the step of ensuring that no more than a minimum number of said work redirection actions are performed.

12. The method of claim 9 further comprising the step of identifying, by means of an indirect bump mask, a subset of said set of one or more destination processors to accomplish the processor complex goal of displacing a lowest priority work unit of a set of active work units executing on said subset of said set of one or more destination processors, after completion of said one or more work redirection actions.

13. The method of claim 12 further comprising the step of ensuring that no more than a minimum number of said work redirection actions are performed.

14. The method of claim 12 in which said step of assigning further comprises the step of insuring that said step of assigning is not performed unless no more than a threshold derived number of said work redirection actions are to be performed.

* * * * *